United States Patent [19]

Taylor

[11] 4,031,978
[45] June 28, 1977

[54] ENERGY ABSORBER UNIT AND ENERGY MANAGEMENT SYSTEM

[75] Inventor: Paul H. Taylor, Grand Island, N.Y.

[73] Assignee: Tayco Developments, Inc., North Tonawanda, N.Y.

[22] Filed: May 28, 1975

[21] Appl. No.: 581,544

[52] U.S. Cl. .............................. 180/91; 180/64 R; 180/103 A; 188/1 C; 293/1
[51] Int. Cl.² ........................................ B60N 21/00
[58] Field of Search .............. 180/91, 82 R, 103 A, 180/64 R; 188/1 C; 293/1

[56] References Cited

UNITED STATES PATENTS

| 3,097,725 | 7/1963 | Peterson | 293/1 |
|---|---|---|---|
| 3,146,014 | 8/1964 | Kroell | 188/1 C X |
| 3,347,501 | 10/1967 | Eimeren | 180/64 R X |
| 3,486,395 | 12/1969 | Yoshioka | 188/1 C X |
| 3,672,697 | 6/1972 | Knowles | 180/82 R X |
| 3,700,273 | 10/1972 | Jackson | 293/70 |
| 3,717,224 | 2/1973 | Leach | 188/1 C |
| 3,815,703 | 6/1974 | Delorean | 180/91 |
| 3,851,722 | 12/1974 | Grosseau | 180/82 R |
| 3,860,258 | 1/1975 | Feustel | 180/91 X |

FOREIGN PATENTS OR APPLICATIONS 1,280,548 11/1961 France .................. 188/1 C Primary Examiner—Joseph F. Peters, Jr.
Assistant Examiner—John P. Silverstrim
Attorney, Agent, or Firm—Joseph P. Gastel

[57] ABSTRACT

An energy absorber unit including a cylinder, liquid in the cylinder, a piston for movement into the cylinder for providing a liquid energy absorbing capability, and relatively movable parts associated with the cylinder and having frictional engagement for additionally providing a dry energy absorbing capability. An energy absorbing unit including a tubular cylinder, a first tubular member slidable on the cylinder for carrying a force receiving member, and a second tubular member mounted on the first tubular member for mounting the first tubular member on a supporting member. An energy management system for a vehicle having a frame, an engine mounted on the frame and a bumper, including a first energy absorber unit mounted between the engine and the bumper and a plurality of second energy absorber units mounted between the bumper and the frame.

15 Claims, 19 Drawing Figures

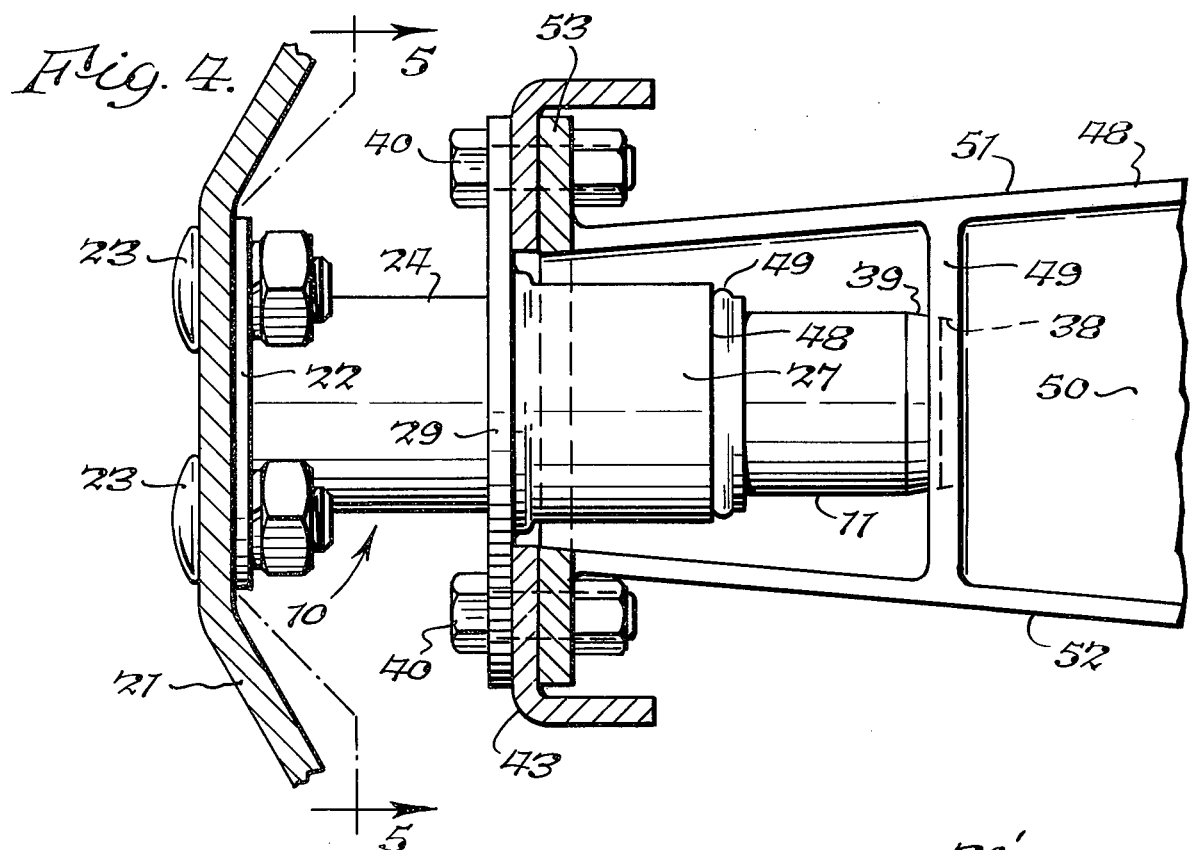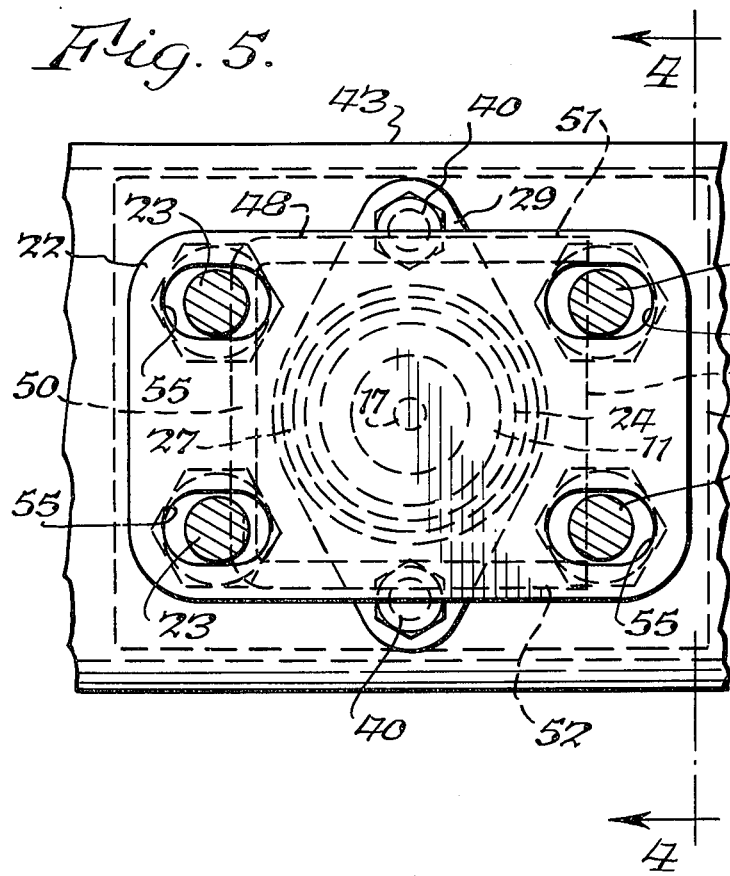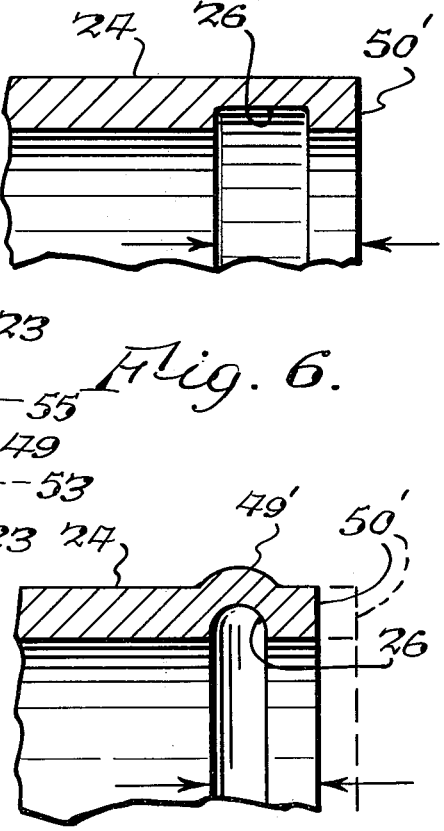

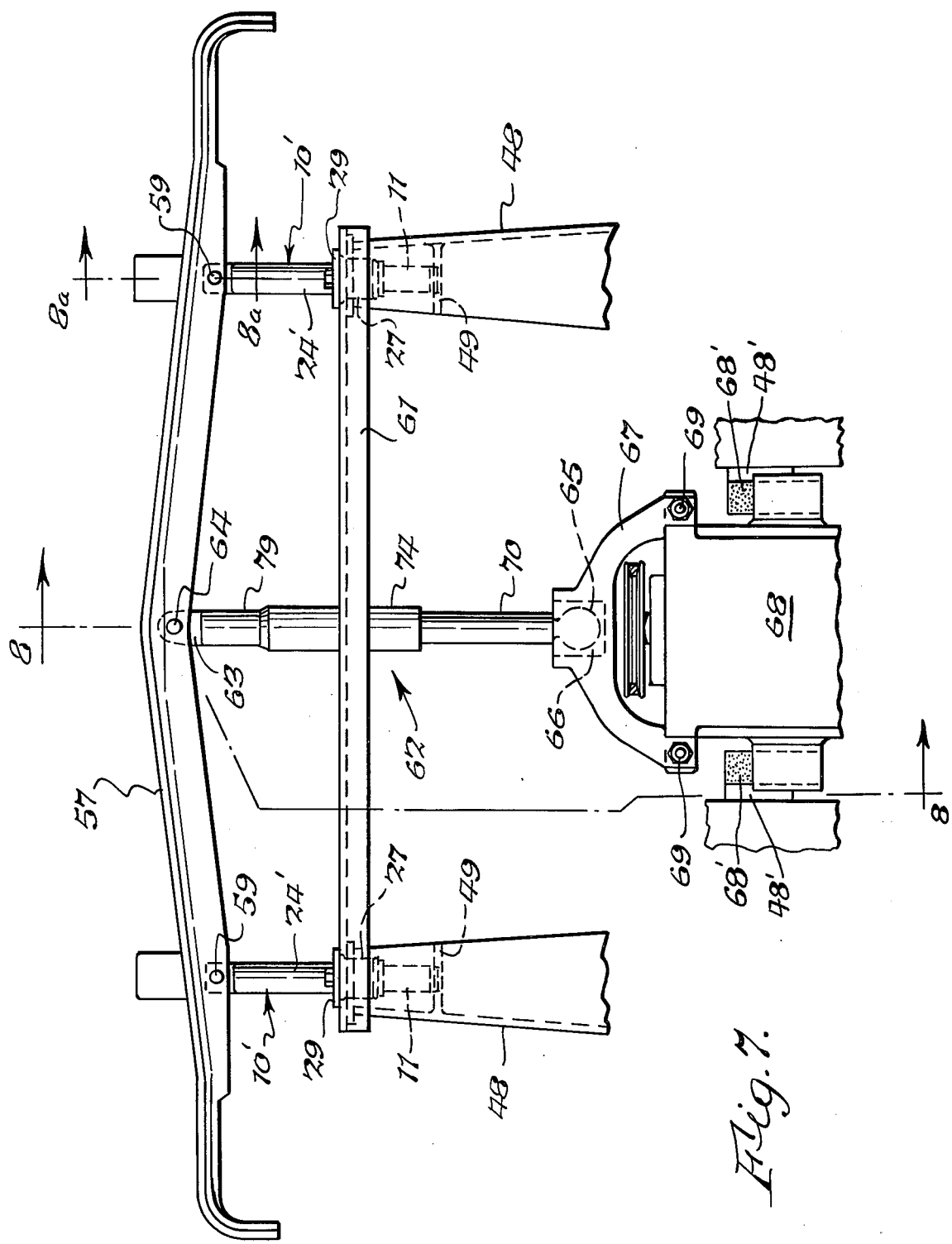

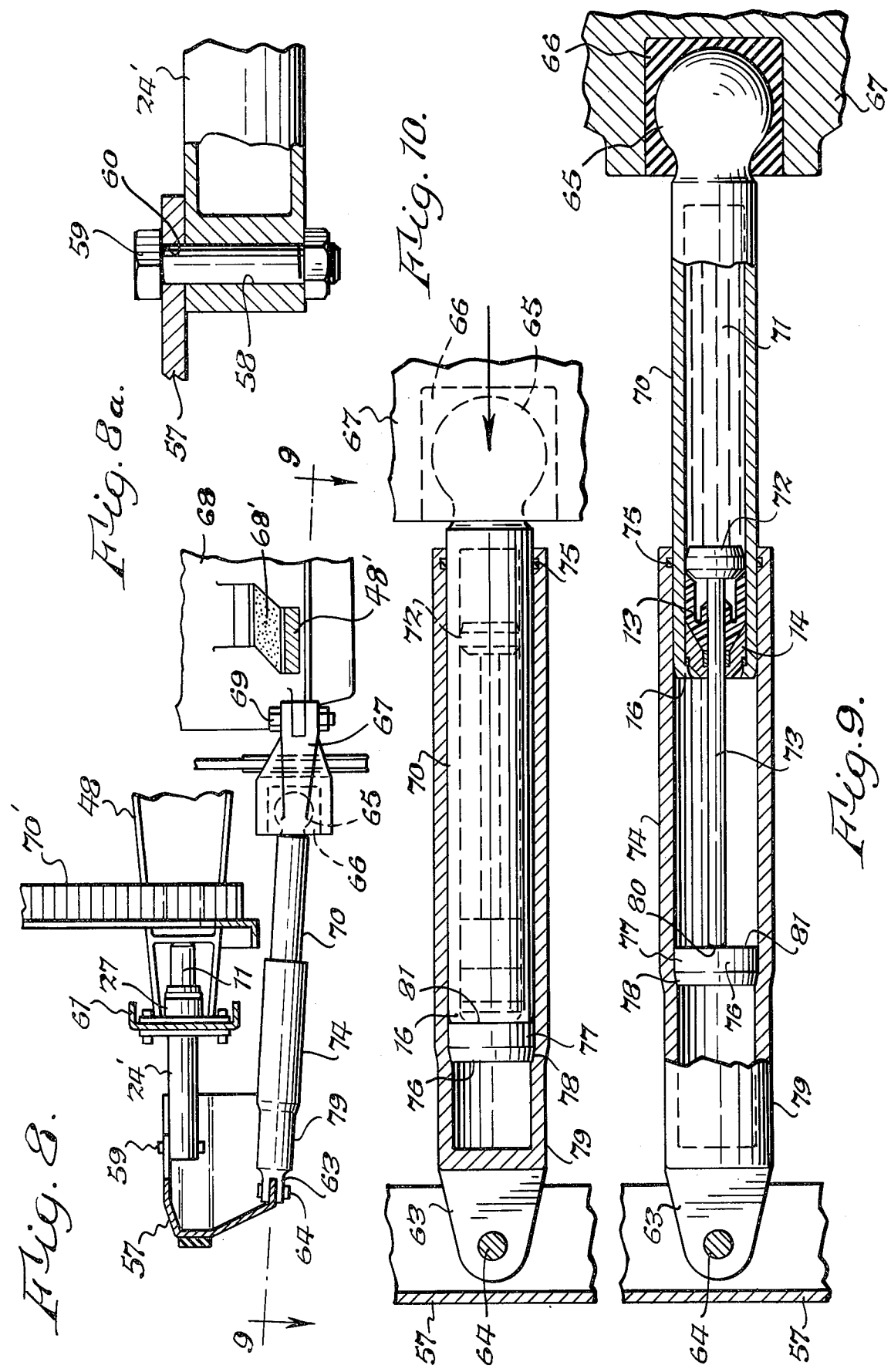

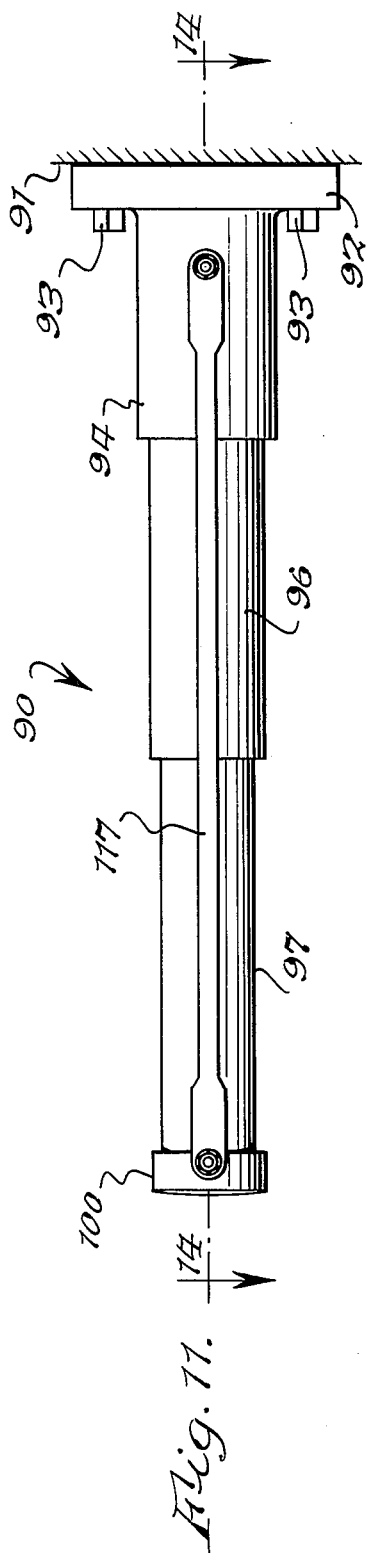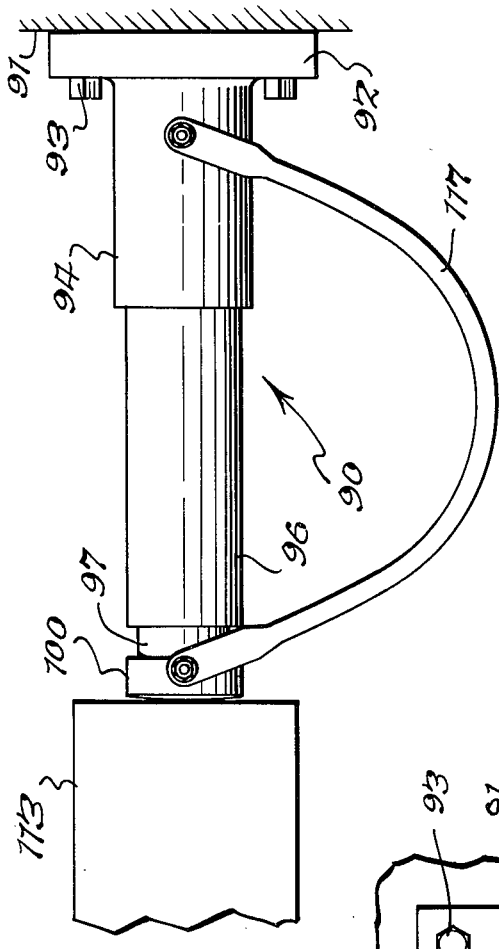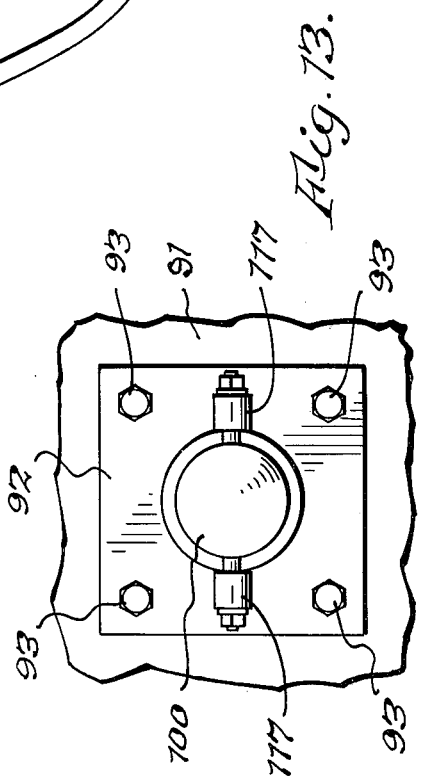

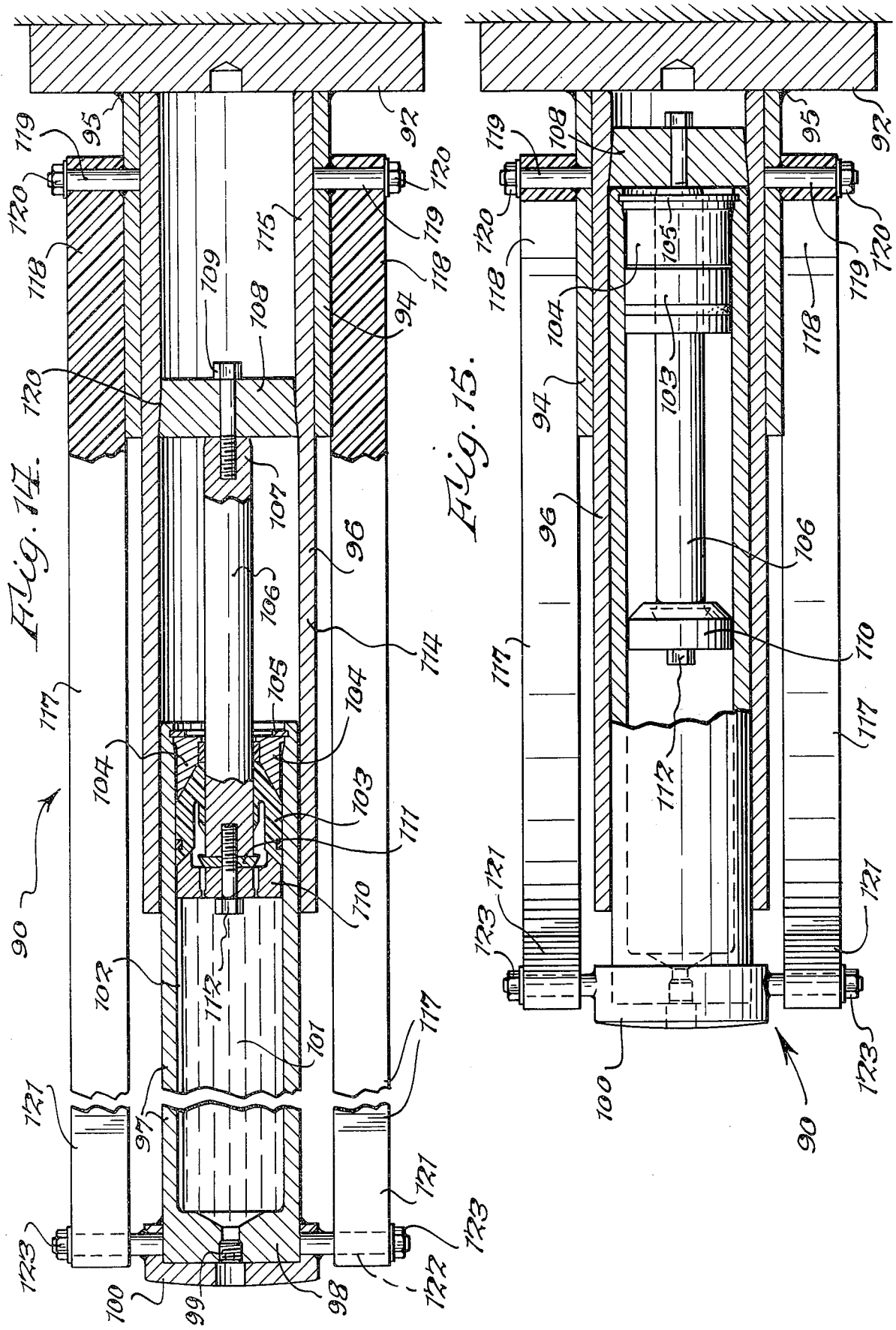

ENERGY ABSORBER UNIT AND ENERGY MANAGEMENT SYSTEM

The present invention relates to an improved energy absorber unit and to an improved energy management system for use in vehicles.

In recent years energy management systems were installed in the bumpers of vehicles to cushion impact in a damage-free manner at five miles per hour. However, for impacts exceeding five miles per hour, additional devices, such as air bags, were required. These additional devices increased the complexity and cost of the entire system. In addition, in the past energy absorber units which were utilized had a limited capacity for their size. It is with overcoming the deficiencies of prior energy absoring units and energy management systems that the present invention is concerned.

It is accordingly one object of the present invention to provide an energy management system for a vehicle which distributes the force of a collision so that the bumper system of the vehicle can be made substantially lighter and much greater energy absorption can be realized in the bumper, thereby lessening the need for supplemental energy absorbing devices in the vehicle.

Another object of the present invention is to provide an improved energy management system which utilizes the weight of certain portions of the vehicle to aid in absorbing vehicle impacts.

A further object of th present invention is to provide an improved energy absorber unit which has a very high energy absorbing capability for its size. A related object of the present invention is to provide an improved energy absorber unit which can produce an energy absorbing function because of the manner in which it is installed in the vehicle in addition to the energy absorbing function which it performs because of the nature of its construction.

A still further object of the present invention is to provide an improved energy absorber unit having a construction which permits it to effectively resist bending loads applied thereto.

Yet another object of the present invention is to provide an improved energy absorber unit which can be made from light tubular extrusions and simple parts and yet possess a very high energy absorbing capability.

Still antoher object of the present invention is to provide an improved energy absorber unit which can be installed in a vehicle simply and quickly and which is capable of being utilized in vehicle environments where close tolerances are not required.

A still further object of the present invention is to provide an energy absorber unit for use on a bumper of a vehicle which can be subjected to large towing forces without causing such forces to be induced into the energy absorber portions of the energy absorber unit.

Yet another object of the present invention is to provide an improved energy absorber unit which is a simple, low cost element which cna be easily replaced when damaged.

A still further object of the present invention is to provide an improved energy management system for a vehicle which will absorb center pole impacts in a highly efficient manner.

Other objects and attendant advatages of the present invention will readily be perceived hereafter.

One aspect of the present invention relates to an energy absorber unit comprising first means for absorbing a first force, and second means for absorbing a second force which exceeds said first force, with said second means being inactive unless said second force is applied to said energy absorber unit. In its more specific aspects, the first means comprises a liquid energy absorber and the second means comprises a dry energy absorber.

Another aspect of the present invention relates to an energy absorbing unit comprising a tubular body portion, first means slidable longitudinally on said tubular body portion for mounting a force receiving member for receiving an external force, and second means mounted on said first means for mounting said first means on a support member while permitting said first means to slide relative thereto.

The present invention also relates to an energy management system for a vehicle having a frame, an engine mounted on said frame, and a bumper comprising an energy absorbing unit, first means for coupling said energy absorbing unit to said engine, and second means for coupling said energy absorbing unit relative to said frame. In its more specific aspect, the energy absorbing unit is coupled between the engine and the bumper. In its still more specific aspect, the energy management system includes a plurality of additional energy absorbing units and means for coupling said additional energy absorbing units between said bumper and said frame.

The various aspects of the different facets of the present invention will be more readily perceived hereafter when the following portions of the specification are read in conjunction with the accompanying drawings wherein:

FIG. 4 is a cross sectional view taken substantially along line 4—4 of FIG. 5 and showing an alternate way of mounting an energy absorber unit of the type shown in FIGS. 1-3 on a modified frame of a vehicle;

FIG. 5 is a fragmentary cross sectional view taken substantially along line 5—5 of FIG. 4 and showing the interrelationship between the various parts of the energy absorber unit, the mounting brackets, and the frame of the vehicle;

FIG. 6 is a fragmentary cross sectional view showing the configuration of a portion of the bumper supporting sleeve during an initial stage of its fabrication;

FIG. 6a is a fragmentary cross sectional view similar to FIG. 6 but showing the configuration of a portion of the sleeve after it has been upset;

FIG. 7 is a fragmentary plan view of an improved energy management system which utilizes the energy absorber units shown in FIGS. 4-6 and in addition utilizes an energy absorber unit mounted between the bumper and the vehicle engine;

FIG. 8 is a fragmentary cross sectional view taken substantially along line 8—8 of FIG. 7 and showing further details of the system;

FIG. 8a is a fragmentary cross sectional view taken substantially along line 8a—8a of FIG. 7 and showing the manner of mounting the bumper onto the end of the energy absorber unit;

FIG. 9 is a fragmentary cross sectional view taken substantially along line 9—9 of FIG. 8 and showing the construction of a modified form of energy absorber unit utilizing both liquid and dry energy absorbing structure, this view showing the relative positions of the various parts prior to impact;

FIG. 10 is a view similar to FIG. 9 but showing the relative positions of the various parts after an impact which exceeded the energy absorbing capability of the liquid portion of the energy absorber unit;

FIG. 11 is a side elevational view of another form of the improved energy absorber unit of the present invention utilized as an industrial crane buffer, with the unit being shown in an extended condition;

FIG. 12 is a view similar to FIG. 11 but showing the energy absorber unit in a compressed condition while it is sustaining an impact;

FIG. 13 is an end elevational view taken from the left of FIG. 11;

FIG. 14 is an enlarged fragmentary cross sectional view taken substantially along line 14—14 of FIG. 11 and showing the various internal parts; and FIG. 15 is a view similar to FIG. 14 but showing the position of the various parts after the energy absorber unit has sustained a maximum overload impact.

Figure 1:
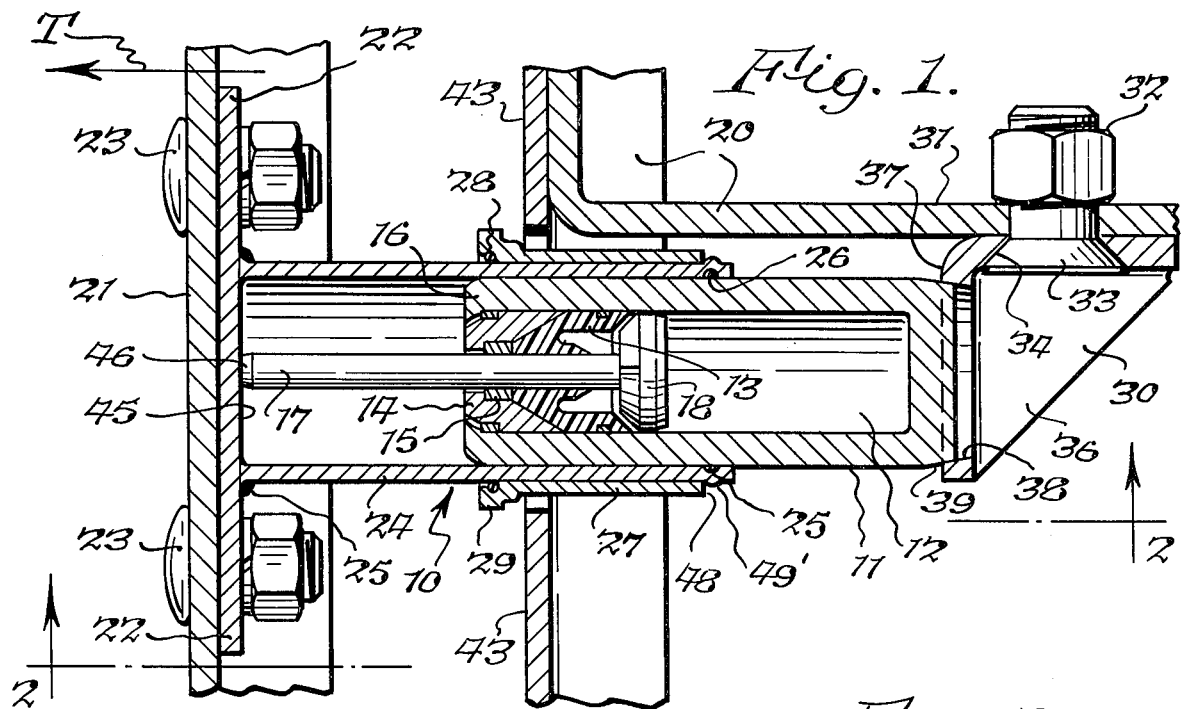
FIG. 1 is a fragmentary horizontal cross sectional view taken substantially along line 1—1 of FIG. 2 and showing an improved energy absorber unit mounted on a vehicle frame and supporting a vehicle bumper.
Figure 2:
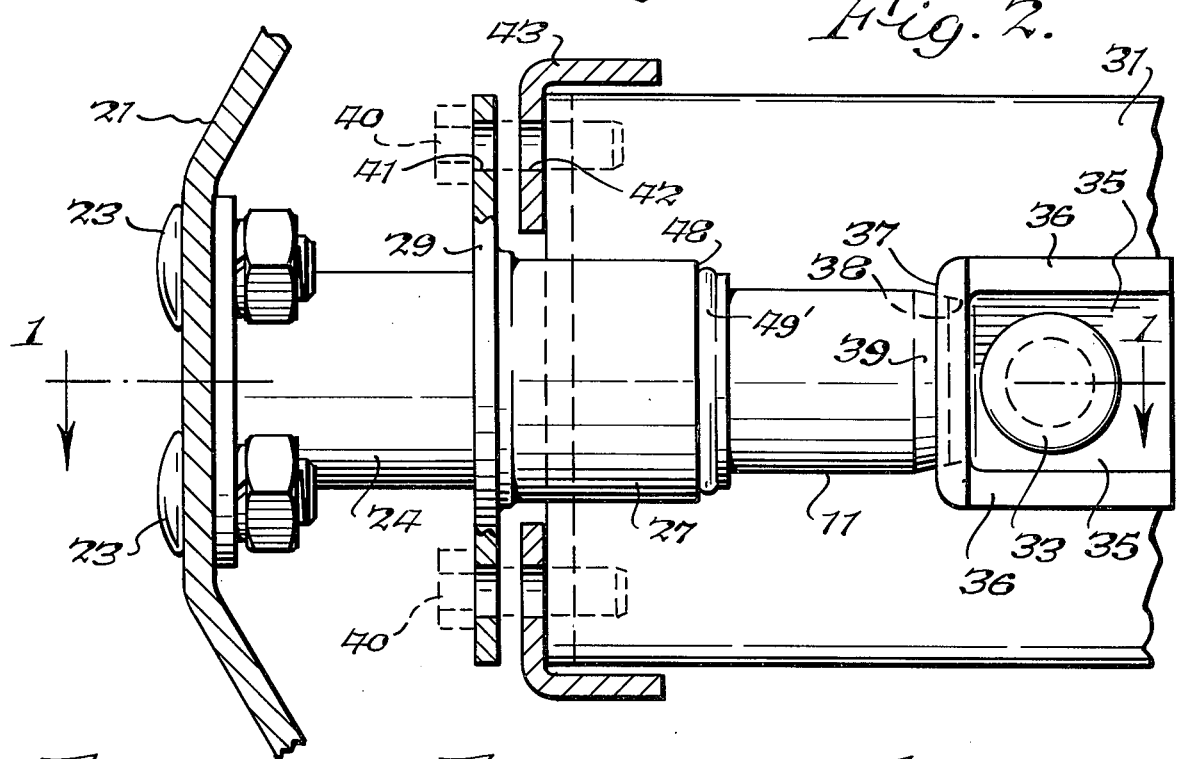
FIG. 2 is a cross sectional side elevational view taken substantially along line 2—2 of FIG. 1.

One form of the improved energy absorber unit 10 is shown in FIGS. 1 and 2. This unit includes a liquid energy absorber portion and a dry energy absorber portion. The liquid energy absorber portion includes a tubular body portion or cylinder 11 which contains a suitable hydraulic liquid 12 held therein by a suitable seal 13 maintained in position by a cap 14 havig a plastic guide ring element 15 therein. The foregoing structure is maintained in position by the crimped end 16 of cylinder 12. A piston 17 extends through suitable aligned apertures in the various elements shown in FIG. 1 and carries a piston head 18 on the end thereof within cylinder 11. As is well understood in the art, as piston 12 moves to the right in FIG. 1 it will compress liquid 12 which moves around piston head 18, which acts in the nature of a damper. The foregoing described portion of energy absorbing unit 10 may be of the type disclosed in my prior U.S. Pat. No. 3,722,640. The dry energy absorbing portion of the unit will be described after the description of how it is installed.

The improved energy absorber unit 10 can be mounted on vehicle frame 20 easily. Furthermore, it will not be adversely affected by bending loads which are experienced when the bumper 21 receives an impact which is not directly in line with the axis of cylinder 11. In this respect, bumper 21 is secured to flange 22 by means of nut and bolt assemblies 23. Flange 22 in turn is secured to the end of tubular member or sleeve 24 by means of weld 25. Tubular member 24 has an internal diameter which permits it to receive the outside of cylinder 11 in complementary mating relationship with a relatively tight fit but which will permit relative longitudinal movement therebetween. An O-ring 25 is located in groove 26 (FIG. 6a) to act as a dust seal between cylinder 11 and tubular member 24..

A second tubular member or sleeve 27 is mounted with a tight sliding fit on the outside of first tubular member 24. An O-ring 28 is suitably positioned in a groove (not numbered) in the flange 29 of member 27 to provide a dust seal and to minimize rattles.

In order to install energy absorber unit 10 on the vehicle frame, it is first necessary to mount bracket 30 on frame member 31 by means of nut and bolt assembly 32. The flat head 33 of nut and bolt assembly 32 abuts against the side of aperture 34 in bracket side 35 to thus maintain bracket side 35 rigidly in position against frame portion 31. Gussets 36 are positioned between bracket side 35 and bracket side 37 which has a frustoconical aperture 38 therein for receiving the frustoconical end portion 39 of cylinder 11 in complementary mating engagement. During installation of unit 10 on a vehicle, it is merely necessary to insert the tapered end 39 of cylinder 11 into tapered aperture 38. Thereafter, bolts, such as 40, are inserted through aligned apertures 41 and 42, respectively, which are located in flange 29 and vehicle frame member 43, respectively, the latter being suitably secured to vehicle frame member 31. Upon the tightening of the nuts onto bolts 40, flange 29, which is originally spaced from frame member 43 as shown in FIG. 2, will be drawn into abutting engagement with frame member 43. The foregoing parts are also shown in FIGS. 4 and 5 which differs from FIGS. 1 and 2 only in the configuration of the vehicle frame structure.

Assembling the parts in the foregoing manner serves a plurality of functions. First of all, as flange 29 is pulled into contact with frame member 43, the energy absorber unit 10 is preloaded because the inner surface 45 of flange 22 bears against the end 46 of piston 17 to drive it into the liquid 12 within cylinder 11. This occurs because the end 48 of tubular member 27 abuts the ridge 49' on tubular member 24 as tubular member 27 is moved to the right during the process of attaching flange 29. In addition, the forcing of piston 17 into liquid 12 causes the tapered end 39 of cylinder 11 to move into extremely tight engagement with tapered aperture 38. Thus, by merely tightening bolts 40 into position, the energy absorber unit is securely mounted and the liquid 12 therein is preloaded. This constitutes an advantage over prior art constructions which required additional manipulations to mount the energy absorber unit and further required that the parts be made and assembled to a close tolerance to receive the energy absorber unit. It can readily be seen that because of the foregoing construction close tolerances are not required because the inherent resiliency of the energy absorber unit itself cause it to accommodate itself to the available space. In addition, since only two bolts 40 are required to mount the energy absorber unit 10, the mounting task can be achieved quickly and simply, thereby causing the labor burden to be relatively low. The bumper 21 is thereafter secured onto flange 22 by means of nut and bolt assemblies 23.

Ridge 49' on tubular member 24 is fabricated in the manner shown in FIGS. 6 and 6a. In this respect an annular slot 26' is formed in any suitable manner in the end of tubular member 24. Thereafter, the end 50' of member 24 is subjected to an impacting force which causes it to move from the dotted line position shown in FIG. 6a to the solid line position shown therein, thereby causing groove 26' to be formed into the shape shown at 26 in FIG. 6a.

Figure 3A:
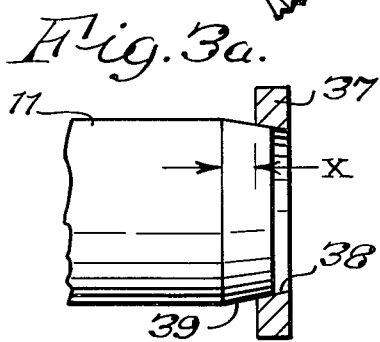
FIG. 3a is a fragmentary diagrammatic view showing the relative positions between the end of the cylinder of the energy absorber unit relative to its supporting bracket portion at installation.
Figure 3B:
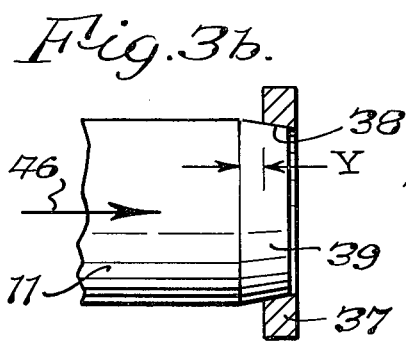
FIG. 3b is a view similar to FIG. 3a but showing the relative positions after the impact has slightly exceeded five miles per hour.
Figure 3C:
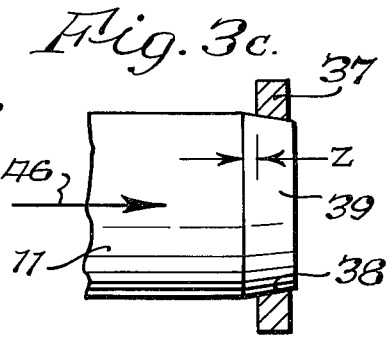
FIG. 3c is a view similar to FIGS. 3a and 3b which shows the relative positions after an impact of about seven and one-half miles per hour.

In accordance with the present invention, the improved energy absorber unit 10 includes a dry energy absorber portion in addition to the above-described liquid energy absorber portion. The dry portion is obtained as a result of positioning the frustoconical end portion 39 of cylinder 11 in frustoconical bore 38. In this respect, the parameters of the system are such that the liquid energy absorber portion of the unit will absorb impacts up to five miles per hour as a result of piston 17 being driven into liquid 12 when bumper 21 is hit. At this time only piston 17 will move so that the distance X (FIG. 3a) remains the same as shown at installation. In the event that bumper 21 experiences an impact in excess of five miles per hour, that is, beyond the limit of the energy absorbing capability of the liquid portion of the unit, cylinder 11 will move in the direction of arrow 46 so as to drive tapered portion 39 into tapered aperture 38 a distance of X minus Y. If the velocity of impact should be about seven and one half miles per hour, the cylinder 11 will be driven to position Z, as shown in FIG. 3c. The progressive driving of the tapered end of cylinder 11 into tapered aperture 38 will act to absorb energy in a dry manner, thereby adding to the energy absorbing capability of the liquid portion of the unit to provide a sequential action wherein the liquid portion acts first and the dry portion acts later. The fact that the end of cylinder 11 may be driven into bracket portion 37 serves as a measure of indicating the severity of the impact. In other words, the relative positions in effect function as a gauge. If desired, bore 38 need not be frustoconical but may be of any desired shape, as long as it provides resistance to movement of the cylinder 11.

At this point it is to be noted that ridge 49' on tubular member 24 functions as an abutment to prevent sleeve 24 from being pulled out of tubular member 27 in the event that a towing force T (FIG. 1) is applied to bumper 21. It will be appreciated that if there was an impact whereby cylinder 11 was moved to the position shown in FIG. 3c, after the bumper 21 was pulled away from the vehicle body, as it would be in towing, there is a good possibility that cylinder 11 would become loosened relative to bracket 36 so that the resulting rattle would be an indication that the vehicle had experienced an impact which sprung the energy absorber unit, thereby indicating that replacement of all or part of the unit was desirable.

In view of the fact that there is a substantial axial overlap between tubular member 27, tubular member 24, and cylinder 11, any bending stresses applied to energy absorber unit 10 will be greatly resisted. These bending stresses are experienced when the bumper 21 is subjected to a force which is not in line with the axis of cylinder 11.

In FIGS. 4 and 5 a modified frame structure is shown for mounting the energy absorber unit 10. The same numerals in FIGS. 4 and 5 which appear in FIGS. 1 and 2 are used to designate identical elements of structure. The installation of FIGS. 4 and 5 differs only in the shape of the vehicle frame 48. In this respect, the frame includes a bulkhead 49 having a tapered hole 38 for receiving tapered cylinder end 39. Bulkhead 48 is supported within C-shaped frame member 48 having a side 50 and upper and lower legs 51 and 52, respectively. A flange 53 is suitably secured to the end of frame member 48 for receiving bolts 40 which also extend through flange 29. Slots 55, which receive bolts 23, are provided in bumper mounting plate 22 to enhance the ease of installation.

The taper of frame member 48 provides gradually increased structural strength to provide an energy absorbing action for collisions above ten miles per hour. In other words, the liquid energy absorber portion of unit 10 will become activated first and after it has absorbed energy to the limit of its capacity, the dry energy absorber portion 38-39 will come into play, as discussed in detail above, and after it has reached the limit of its energy absorbing capability, the tapered frame member 48 will buckle to further absorb the energy of impact. If desired, bulkhead 49 may be made with flanges and may be bolted to the remainder of frame 48 for replacement. Because of the fact that energy absorber unit 10, including the liquid and dry aspects thereof, are mounted on the centerline of frame 48, the combination will be able to absorb relatively high shocks and consequently this will permit the utilization of lighter structural forms for obtaining desired strengths.

In FIGS. 7-10 the improved energy management system of the present invention is disclosed. This system essentially consists of a center energy absorber unit 62 coupled between the bumper and the vehicle engine, and it also includes a pair of energy absorbing units 10' effectively positioned between bumper 57 and vehicle frame members 48, which are identical to vehicle frame members 48 of FIGS. 4 and 5. Energy absorber units 10' are identical to energy absorber units 10 described above except that tubular member 24' is a modification of tubular member 24 in that it contains a bore 58 (FIG. 8a) which receives nut and bolt assembly 59 which also passes through aperture 60 in bumper 57.

In the system of FIGS. 7-10, a center energy absorber unit 62 has a clevis end 63 secured to the edge of bumper 57 by means of a suitable pin 64. The opposite end of unit 62 is formed into a ball 65 which is received in rubber mounting 66 in yoke or bracket 67 secured to vehicle engine 68 by means of nut and bolt assemblies 69. A frame member 61 extends across frame members 48, as shown in FIGS. 7 and 8. The manner in which unit 62 is installed permits it to clear the engine drive shaft and the radiator 70'.

Energy absorbing unit 62 includes a liquid energy absorbing portion and a dry energy absorbing portion. However, its structure is different from the embodiment shown in FIGS. 1-5. In this respect, a cylinder 70 is provided which contains liquid 71 and receives piston head 72 mounted at the end of piston 73. The sealing arrangement in cylinder 70 may be identical to that described above relative to FIGS. 1-5. The end of cylinder 70 is formed into ball 65 which is received in yoke 67, as described above. A casing 74 has an internal diameter which closely approximates the external diameter of cylinder 70 to receive the latter with a tight sliding fit. An O-ring seal 75 is provided in a suitable slot in casing 74.

Preferably casing 74 is fabricated by driving plug 76 into the position shown by a press, plug 76 including a cylindrical surface 77 and a frustoconical surface 78. Originally casing 74 is of the same diameter as portion 79 of the casing but it is expanded due to the driving of plug 76 to the position shown in FIG. 9. The end 80 of piston 73 abuts surface 81 of plug 76.

In the event bumper 57 is struck by a foreign object when the vehicle is traveling approximately five miles per hour, cylinder 70 will be driven to the left while piston 73 remains stationary relative to plug 76. This will cause piston 73 to move into liquid 71 to absorb the energy of the impact. The engine and the drive train, which comprise approximately twenty-five percent of the weight of the vehicle, will resist movement of energy absorber 62 to the right. However, in the event that the impact velocity is greater than five miles per hour, casing 74 will move to the right and plug 76 will be driven from the position shown in FIG. 9 to the position shown in FIG. 10. This will provide a dry energy absorbing portion of the energy absorbing stroke which is analogous to the dry portion discussed above relative to FIGS. 1–5. Because the energy is absorbed in this manner, it will be dissipated and therefore up to certain speeds will tend to eliminate the prior occurrence of the engine being forced into the passenger compartment.

It should be noted that the devices of FIGS. 1, 2 and 3 and 7, 8, 9 and 10 have dry energy absorber characteristics due to the deforming of the yieldable element, namely, the bracket or the tube beyond its yield point so as to provide a constant frictional drag from the expansion resulting from a frustoconical surface being driven through it. This essentially provides a constant force where a square wave energy curve absorbs excess energy of a collision greater than five miles per hour.

The energy absorber unit 62 cushions the engine drive train including the engine, transmission, drive shaft, the axle, and the rear wheels and preloads the drive train against the detrimental effects of collision and center pole impacts. In this respect, above five miles per hour, the engine in present automobiles will move forward on its mountings, with the possibility of the fan cutting a hole in the radiator and the drive shaft disengaging from the transmission as the latter moves forward. In addition, above twenty miles per hour on light cars, the engine may be driven into the passenger compartment. The system shown in FIGS. 7–10 will prevent the foregoing possibilities. The energy absorbing unit 62 is mounted in such a manner so as to force engine 68 rearwardly within the flexibility of its engine mountings as essentially shown in FIGS. 7 and 8 wherein conventional rubber engine mounting members 68' are stressed rearwardly between the engine 68 and vehicle frame members 48'. This will move the engine back about one and one-half inches. This in effect preloads the engine backwardly to provide a distance for the engine to travel forwardly. Furthermore, forcing the engine rearwardly dampens the engine oscillations. The energy absorber unit 62 provides an energy absorbing capability of approximately thirty percent, and in addition, the act of moving the engine rearwardly one and one-half inches by the installation of unit 62 provides twenty-five percent more energy absorbing capabilities. Essentially, unit 62 weighs approximately four pounds and this more than offsets the twenty pound reduction of vehicle weight due to eliminating the bumper reinforcement. In addition, the utilization of the system shown in FIG. 7 permits weight reduction of the vehicle because the drive train shock is no longer borne by the vehicle frame. In other words, in prior installations the drive train shock was transmitted to the frame at the various areas at which it was connected thereto. However, with the system of FIGS. 7–10, the drive train shock is transmitted directly to bumper 57 through unit 62. Thus, twenty-five percent of the energy absorption requirements of the engine drive train, including the engine, the transmission, the drive shaft, the axle, and the rear wheels, are absorbed by unit 62.

The system shown in FIG. 7 permits the vehicle to have a lighter bumper and frame because the impact load is distributed over three energy absorbing units, namely, units 10' and 62. The addition of a dry energy absorber unit portion to the liquid portions of the three units permits the absorption of greater impacts and lessens the possibility of the movement of the engine into the passenger compartment of the vehicle. Furthermore, by moving the engine rearwardly in its mounts an extra inch and a half, better protection is provided against centerpole impact because permitting the engine to move forwardly during impact absorbs the energy of the impact directly. The foregoing in turn reduces the energy absorbing requirement of the vehicle frame and permits the vehicle to be made of lighter weight materials.

An industrial crane buffer energy absorbing unit 90 is shown in FIGS. 11–15 and it incorporates the basic principles of the energy absorber unit discussed above having both a liquid energy absorber portion and a dry energy absorber portion. Energy absorber 90 is mounted on the side of crane 91 by means of a bracket 92 which receives bolts 93. Bracket 92 has a short tube 94 welded to it at 95, and it is this short tube which mounts the remainder of the energy absorber unit. In this respect a tubular member 96 is fixedly secured within tube 94 and it in turn slidably receives cylinder 97 having an end 98 which is closed by a plug 99. An impact receiving cap 100 is suitably secured over end 98. Suitable hydraulic liquid 101 is contained within cylinder 97 and a small amount of air 102 is also contained within the cylinder 97. The fluids 101 and 102 are retained within cylinder 97 by a seal 103 which is held in position by a cap 104 which in turn is held in cylinder 97 by snap ring 105. A piston 106 has one end 107 secured to plug 108 by screw 109. The other end of piston 106 extends into cylinder 97 through suitable aligned apertures in the various members and it carries a piston head 110 and a high fluid velocity deflector 111, both of which are secured to the end of piston 106 by screw 112.

Whenever cap 100 strikes a foreign object 113, which may be another crane, or a wall, or any other type of abutment, cylinder 97 will telescope into cylinder 96 while piston 106 is held stationary by a substantially frustoconical plug 108. This will initially cause compression of air 102 so that while the air is being compressed, the assembly 90 will function as a shock absorber. After air 102 has been compressed to its limit, continued movement of cylinder 97 will cause compression of liquid 101 to thereby absorb energy, as is well understood. This action will continue to the limit of movement of piston 106 into cylinder 101 to provide a liquid energy absorber action. Continued movement of cylinder 97 thereafter will move plug 108 from the position shown in FIG. 14 toward the position shown in FIG. 15. At this point it is to be noted that cylinder 96 includes a reduced wall portion 114 and a thicker wall portion 115. The movement of plug 108 through thicker wall portion 115 from the position of FIG. 14 toward the position of FIG. 15 with the accompanying deformation of portion 115 provides a dry energy absorber action to supplement the liquid energy absorber action described previously.

Band springs 117 are mounted on diametrically opposite sides of unit 90. In this respect first ends 118 are pivotally mounted on pins 119 extending outwardly from tubular member 115. Suitable nuts 120 retain these ends of bands 117 in position. The opposite ends 121 of bands 117 are pivotally mounted on pins 122 extending outwardly from cylinder 97. Nuts 123 hold ends 121 in position.

Bands 117 serve a triple function. Firstly, they act as a mechanical spring so that after foreign body 113 has been moved away from cap 100 and after liquid 101 has expanded, spring 117 will continue to expand to the straight line position shown in FIG. 11 to bring unit 90 back to the position of FIG. 14 because the air 102 cannot expand by itself with a sufficient force to return the parts to their initial position. However, springs 117 will expand to a straight line condition only if plug 108 has not been moved to the right from the position of FIG. 14. The second function of springs 117 is to prevent cylinder 97 from popping out of the remainder of the assembly in the event there should be some malfunction which might cause such separation. In other words, once members 117 have been expanded to their straight line condition shown in FIG. 11, cylinder 97 can no longer move to the left. In this sense springs 117 act as a holdback. This is especially desirable on cranes which are operating high above a floor, where separation and dropping of cylinder 97 to the floor can result in injury to personnel or equipment. The third function of springs 117 is to act as an indication of the condition of energy absorber unit 90. In this respect if unit 90 has been jammed to the position where plug 108 has been moved to the right from the position of FIG. 14, subsequent expansion of liquid 101 cannot extend unit 90 to its original length. Therefore, springs 117 will remain bowed and thus indicate to the viewer that unit 90 needs replacement.

The fact that springs 117 are placed on the outside of the unit 90 permits the entire unit to be shortened by approximately one-third over the length which it would otherwise require if the springs were placed internally. Springs 117 may be made out of suitable metal or plastic and may have any desired configuration which will provide the intended result.

It is to be noted that portion 114 of tube 96 may be sized by pushing plug 108 to the position shown in FIG. 14. However, it will take considerably more force to push plug 108 from the position of FIG. 14 to the position of FIG. 15 because tube portion 115 is backed by tube 94 which reinforces tube portion 115 against deformation.

While preferred embodiments of the present invention have been disclosed, it will be appreciated that it is not limited thereto but may be otherwise embodied within the scope of the following claims.

What is claimed is:

1. An energy management system for a vehicle having a frame, an engine movably mounted on said frame, and a bumper comprising impact energy absorbing unit means having first and second end portions, first means coupling said first end portion of said energy absorbing unit means to said bumper and second means coupling said second end portion of said energy absorbing unit means to said engine to cause impacts received by said bumper to be transmitted to said first end portion of said energy absorbing unit means while the forward momentum of said engine moving forwardly relative to said frame is transmitted to said second end portion of said energy absorbing unit means.

2. An energy management system as set forth in claim 1, said second means comprising bracket means attached to said engine, and mounting means on said bracket means for receiving said second end portion of said energy absorbing unit means while permitting relative movement therebetween to permit said engine to experience normal vibratory movement.

3. An energy management system as set forth in claim 2 wherein said first means couples said first end portion to the center of said bumper.

4. An energy management system as set forth in claim 2 wherein said mounting means comprises a cushioned ball joint.

5. An energy management system as set forth in claim 2 wherein said bracket means comprises a yoke.

6. An energy management system as set forth in claim 1 wherein said first means couples said first end portion to the center of said bumper.

7. An energy management system as set forth in claim 1 wherein said engine is normally located rearwardly in its engine mounts to thereby permit said engine to move forwardly during impact.

8. An energy management system as set forth in claim 1 including a plurality of additional energy absorbing unit means, and means for coupling said additional energy absorbing unit means between said bumper and said frame.

9. An energy management system as set forth in claim 8 wherein certain of said energy absorbing unit means include third means for absorbing energy levels below a predetermined level and fourth means for absorbing energy levels above said predetermined level, said fourth means being inactive unless said energy exceeds said predetermined level.

10. An energy management system as set forth in claim 9 wherein said certain of said energy absorbing means includes all of said energy absorbing unit means.

11. An energy management system as set forth in claim 9 wherein said third means comprises a liquid energy absorber unit and wherein said fourth means comprises a dry energy absorber unit.

12. An energy management system as set forth in claim 11 wherein said liquid energy absorber unit comprises a cylinder, liquid in said cylinder, and a piston in said cylinder, and wherein said dry energy absorber unit comprises first and second members which are movable relative to each other after said piston has been driven into said cylinder a predetermined amount by said first force.

13. An energy management system as set forth in claim 12 wherein said first member comprises a casing mounted on said cylinder and wherein said second member comprises means on said casing, and wherein said cylinder is in position to be driven against said means on said casing.

14. An energy management system as set forth in claim 13 wherein said casing is tubular and wherein said means on said casing comprises a plug positioned within said casing.

15. An energy management system as set forth in claim 14 wherein said plug is of a cross-sectional dimension which is greater than a portion of the cross-sectional dimension of said casing for receiving said plug when said second force is experienced.

* * * * *